US007933952B2

(12) United States Patent
Parker et al.

(10) Patent No.: US 7,933,952 B2
(45) Date of Patent: Apr. 26, 2011

(54) COLLABORATIVE DOCUMENT AUTHORING

(75) Inventors: Jared Parker, Redmond, WA (US); Martin Cox, Redmond, WA (US); Greg Prickril, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 11/824,496

(22) Filed: Jun. 29, 2007

(65) Prior Publication Data

US 2009/0006936 A1      Jan. 1, 2009

(51) Int. Cl.
*G06F 15/16* (2006.01)
*G06F 17/00* (2006.01)

(52) U.S. Cl. .................. 709/204; 709/205; 715/200

(58) Field of Classification Search .............. 709/204, 709/205; 715/200
See application file for complete search history.

(56) References Cited

U.S. PATENT DOCUMENTS

| | | | |
|---|---|---|---|
| 6,529,905 B1 | 3/2003 | Bray et al. | |
| 6,760,886 B1 | 7/2004 | Nadon et al. | |
| 7,124,362 B2 | 10/2006 | Tischer | |
| 7,539,938 B2* | 5/2009 | Ross et al. | 715/255 |
| 2003/0121008 A1* | 6/2003 | Tischer | 715/530 |
| 2004/0006585 A1 | 1/2004 | Paulus et al. | |
| 2004/0216039 A1* | 10/2004 | Lane et al. | 715/511 |
| 2005/0033813 A1* | 2/2005 | Bhogal et al. | 709/206 |
| 2006/0010125 A1 | 1/2006 | Beartusk et al. | 707/201 |
| 2006/0101328 A1 | 5/2006 | Albornoz et al. | |
| 2006/0136477 A1* | 6/2006 | Bishop et al. | 707/102 |
| 2006/0136511 A1 | 6/2006 | Ngo et al. | |
| 2006/0218476 A1 | 9/2006 | Gombert | |
| 2006/0235789 A1 | 10/2006 | Koch | |
| 2006/0235984 A1* | 10/2006 | Kraus et al. | 709/228 |
| 2007/0016650 A1* | 1/2007 | Gilbert et al. | 709/207 |
| 2007/0124373 A1* | 5/2007 | Chatterjee et al. | 709/204 |
| 2007/0255674 A1* | 11/2007 | Mahoney | 707/1 |

OTHER PUBLICATIONS

PCT International Search Report mailed Dec. 31, 2008, in connection with International Application No. PCT/US2008/065997, 10 pages.
"Collaborative Writing Tools and Technology: A Mini-Guide," Date: Mar. 1, 2007, pp. 1-13, http://www.kolabora.com/news/2007/03/01/collaborative_writing_tools_and_technology.htm.
Earnshaw et al., "GrooveUp Step up to the next Groove," Virginia Tech, Date: May 10, 2004, pp. 1-15, http://courses.cs.vt.edu/~cs5734/final_designs/GrooveUp.pdf.

* cited by examiner

*Primary Examiner* — Ranodhi N Serrao
*Assistant Examiner* — Umar Cheema
(74) *Attorney, Agent, or Firm* — Merchant & Gould

(57) ABSTRACT

Embodiments are provided to enable a collaborative authoring of a document or other data structure. In an embodiment, a system includes a number of components configured to structure a collaborative authoring process. The components of the system can be used to define a number of sections, roles, and other collaboration parameters associated with a collaboration effort. A workspace can be provisioned to allow participants to interact with the document based in part on a number of permissions. Components of the system can be used to communicate a customized document to the participants based in part on an associated role and other collaboration parameters. Other embodiments and collaborative functionality are available.

20 Claims, 6 Drawing Sheets

COLLABORATIVE DOCUMENT AUTHORING

BACKGROUND

Occasionally, a team of users would like to collaborate when authoring a document. The collaboration effort can become difficult and unmanageable when the users attempt to simultaneously modify the document. Moreover, managing a collaboration effort can be very time consuming and collaboration interactions are often managed using e-mail, file sharing, and/or web hosting architectures. Users of many of the current collaboration tools complain about an incoherent view on progress, overwrites, loss of content, and lost time when having to manually assemble content submitted by various users. Consequently, the current collaboration authoring tools are limited and generally result in an unsatisfactory experience for the users.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to enable a collaborative authoring of a document or other data structure. In an embodiment, a system includes a number of components configured to structure a collaborative authoring process. The components of the system can be used to define a number of sections, roles, and other collaboration parameters associated with a collaboration effort. A workspace can be provisioned to allow participants to interact with a document based in part on a number of permissions. Components of the system can be used to communicate a customized document to the participants based in part on an associated role and other collaboration parameters.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to enable a collaborative authoring of a document or other data structure as part of a collaborative authoring process. In an embodiment, a collaboration application can be used to collaborate with other authors when collaborating on a document. The collaboration application can be used to synchronize changes, updates, and other modifications to defined users. In one embodiment, the collaboration application can be used to define a number of sections, wherein each defined section can be associated with a particular user who has permission to interact with the associated section. The collaboration application can use an add-in component to break down (or shred) and reassemble a declarative document from its basic parts to a compound document. For example, the collaboration application can use an open extensible markup language (XML) standard as part of a collaborative authoring effort.

In another embodiment, a collaborative system is configured to provide a collaborative environment for participants to interact with a collaborative document. A number of participants can be associated with the collaborative environment based on certain credentials and other collaborative parameters. For example, depending on associated privileges, a participant can add to, delete from, and/or otherwise modify sections of the collaborative document. Thereafter, all changes made by participants to the collaborative document can be propagated to each participant who is using a client. Each client can be configured to communicate as part of a peer-to-peer communication environment, client/server communication environment, or other communication environment.

Figure 1:
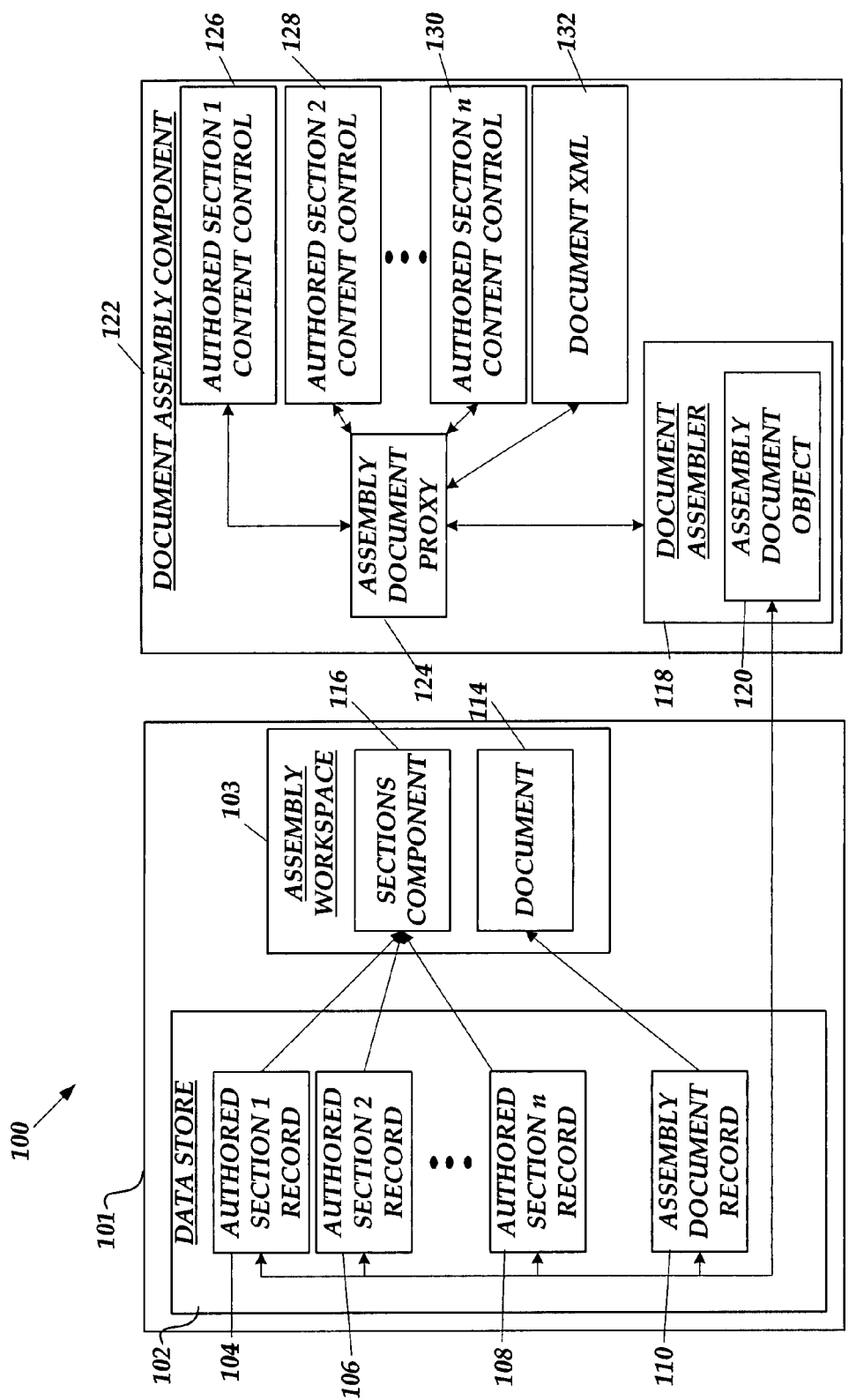
FIG. 1 is a block diagram of a system configured to collaborate information.

FIG. 1 is a block diagram of system 100 configured for collaborating information, under an embodiment. In one embodiment, components of the system 100 can be configured as a collaboration application, such as a software program for example, that can be used to provide an efficient and user-friendly collaboration environment for users to collaborate when creating and authoring a collaborative document (also referred to as an "assembly document" below).

The system 100 includes a client 101 having a data store 102 or other repository and an assembly workspace 103. In one embodiment, the client 101 is configured as a networked collaboration system operating on a computing device, wherein the client can interact with other clients as part of a collaborative effort. The client 101 includes functionality to enforce constraints that have been applied to certain sections of an assembly document. The client 101 is further configured to communicate the constraints (e.g., collaboration privileges) and other information to other invited clients or participants.

The data store 102 is configured to store information, including collaboration metadata, such as a number of section records, roles, participants, document/section ownership, status, and other collaboration associated information. As described below, the collaborative document can be stored in the data store 102 as a collection of parts. Moreover, the data store 102 and information contained therein can be updated at desired times. In one embodiment, the data store 102 can be updated whenever a user has connectivity and a change has been detected by the client 101. For example, time stamping, version numbers, or delta comparisons can be used to detect if there has been a change to parts of a collaborative document.

As shown in FIG. 1 and according to this embodiment, the data store 102 includes an authored section 1 record 104, an authored section 2 record 106, an authored section n record 108 (where "n" is an integer), and an assembly record 110. In one embodiment, each authored section record and the assembly record can be associated with an assembly document. Each authored section record can be described as a container that is used to store interactions made by a participant who has the requisite permission. The following discussion with respect to FIG. 1 is described in the context of documents and associated applications, but the embodiments are not so limited.

The system 100 also includes an assembly workspace 103. In an embodiment, the assembly workspace 103 can be configured as a read-only user interface (UI) and can be used to interact with the data store 102. For example, the UI can include data from the data store 102, such that a user can see a summarized view of a collaboration project and can also access a base document which operates to launch a document editing environment. Accordingly, the assembly workspace 103 can be used to launch an application or other program that can then be used to interact with an information source or other data construct, such as a document file (e.g., .docx), presentation file (e.g., .pptx), etc. In one embodiment, an assembly document can be stored as an attachment to the assembly workspace 103 (e.g., Document Assembly Tool). Thereafter, when the attachment is opened, a custom assembly document can be created for the user of the client 101 based on a number of parameters, which include, but are not limited to: workspace identity; workspace role; and/or, assembly document role.

Accordingly, the assembly workspace 103 can operate to launch an associated application or program depending on the type of information source that is opened. As shown in FIG. 1, an assembly document 114 (shown as a file) is included as part of the assembly workspace 103, wherein a user can select the assembly document 114 and the client 101 can operate to launch a word processing application according to a defined operational sequence, as described below. As another example, the assembly workspace 103 can operate to launch a presentation application associated with a presentation file.

The assembly workspace 103 also includes a sections component 116 that includes metadata and other information associated with a number of authored section records. For example, the sections component 116 can include existing sections and assigned users, section progress state, and read/write status. In one embodiment, the sections component 116 includes a tabular view of section metadata for quick review and/or reporting purposes. For example, metadata for each section record can be displayed in a table for easy monitoring of a project's status.

As described further below, when a user selects the assembly document 114, a document assembler 118 can be used to intercept a normal opening sequence of an application associated with the document. The document assembler 118 can operate to create a document in memory (e.g., RAM), wherein the document can be customized for an end-user depending on an associated role and other parameters described below. The document assembler 118 is configured to interact with and access data and other information from the data store 102 when creating an assembly document object 120.

In one embodiment, a number of actions can be used against the data stored in the data store 102 in order to include the data as part of the assembly document object 120. For example, create, read, update, and/or delete (CRUD) actions can be used to interact with the data store 102 when including data as part of the assembly document object 120. As described below, the assembly document object 120 can be used by a document assembly proxy 124 to enable user interaction therewith based in part on one or more permissions.

In one embodiment, the document assembler 118 is configured as an application programming interface (API) which can be used to interact with the data store 102. The API can be configured to write to and get information from the data store 102. The API can be used locally, remotely, or according to some other communication configuration. The document assembler 118 can be configured to be document type agnostic (e.g., word processing applications, presentation applications, spreadsheet applications, etc.). Correspondingly, the document assembler 118 can be used with any document or other data structure that is XML based (e.g., open XML) to enable a collaborative authoring functionality.

With continuing reference to FIG. 1, the system 100 includes an assembly component 122 that includes the document assembler 118. In an embodiment, the assembly component 122 includes code that runs in the context of a word processing application (e.g., WORD). In another embodiment, the assembly component 122 can be configured as an add-in component and included as part of a word processing application or system. In yet another embodiment, the document assembler 118 can be included as part of the functionality of the assembly workspace 103 or some other functional component or system.

The assembly component 122 also includes an assembly document proxy 124, an authored section 1 content control 126, an authored section 2 content control 128, an authored section n content control 130, and document XML 132. The content controls 126-130 can be configured as self-describing logical entities mapped to document and section abstractions. The content controls 126-130 allow sections of an assembly document to be uniquely identified, dynamically updated, and assigned special security. These object form the backbone of the assembly document as they enable the fragmentation of a document into distinct elements. Moreover, the content controls 126-130 allow independent authors to update sections in parallel.

In one embodiment, the assembly document proxy 124 is an in-memory manifestation of the state of an assembly document (e.g., the assembly document record 110). The assembly document proxy 124 stores data, metadata, content, and/or actions in memory until they are persisted to the client 101 or written to the assembly document record 110. For example, when an assembly document 114 is first loaded, the assembly document proxy 124 can operate to build the assembly document 114 from scratch using information of the data store 102 and the assembly document object 120 to create authored section content controls and other document parameters associated with what is ultimately presented to the end-user (e.g., assembly document 114). In one embodiment, save and refresh operations can be used to update the state of the underlying data source (e.g., assembly template, assembly document, etc.) associated with the assembly document proxy 124.

The document XML 132 can be described as XML code that defines the structure (e.g., fonts, access privileges, sections, etc.) of an assembly document 114. Correspondingly, the document XML 132 provides the underlying structure for formatting, layout, and a container for the content controls 126-130 and custom XML parts. Custom XML parts refer to distinct XML blobs stored as part of the assembly document 114. Assembly templates can use the custom XML parts to store custom metadata. Moreover, an assembly document can use the custom XML parts to uniquely associate a word processing document with an assembly workspace 103. Assembly workspaces and the associated tools can be uniquely named, wherein the names can be persisted in the documents for interaction and association therewith. Accordingly, the custom XML parts provide a store where metadata can be maintained between collaboration sessions.

In an embodiment, a number of client operations are described in Table 1 below.

TABLE 1

| Operation | Authorized Roles | Description |
|---|---|---|
| Insert Section | Editor | Inserts top-level sections for Editors |
| Insert Subsection | Author | |
| Complete Section | Author | This operation indicates that an Author no long intends to edit a section and is invoked by changing a section's status. |
| Delete Section | Editor for top-level sections. Authors for subsections | Removes an section from an assembly document. |
| Assign Authorship | Editor for top-level sections. Authors for subsections | |
| Authorship Reassignment | Editors for top-level section. Authors (for subsection) | |
| Refresh Document | All Roles | This operation updates content and properties in a user's private copy |
| Change the Editor | Editor, Manager | This operation is invoked by changing the assembly document's Editor property. |
| Publish | All Roles | This operation strips the assembly document of all constructs that support certain controls and other parameters (e.g., content controls) |
| Create Workspace | Editor | This operation creates a workspace associated with a single assembly document. |
| Open Task Pane | All | |
| Close Task Pane | All | |
| View DocAssembler Client Properties | All | |
| View Assembly Document Properties | All | |
| View Section Properties | All | |
| Open Workspace | All | Opens the workspace and gives focus |

In one embodiment, a structure of an assembly document 114 can be described as an assembly document containership. Accordingly, a document is the root node of the containership hierarchy. Sections can be placed in-line with content not contained in sections. A section that is not embedded in another section can be referred to as a top-level section. Interstitial content refers to content inside an assembly document that is not within the boundaries of a section. A role can be used to determine which user is able to interact with interstitial content. Sections can contain other sections, referred to as subsections. A section that contains another section can be referred to as a parent section. A top-level section, all its subsections and any subsections they contain can be referred to as the section containership hierarchy. If an insertion point is in a section, that section can be referred to as the current section.

In an embodiment, a schema can be used to define an assembly template which includes data pertaining to the assembly document 114 and section objects. When an assembly template is opened, the assembly document proxy 124 can be populated using the assembly template contents. The assembly template can be updated with any updates when the assembly document 114 is closed. The assembly template can include customized ribbon groups, task pane controls, and custom XML parts. The ribbon and task pane allow users to prepare a template for assembly, whereas the custom XML parts can be used to store and persist metadata associated with an associated assembly document. When a user views and/or updates metadata, the metadata is read from and/or written to the custom XML parts. In one embodiment, the schema defining an assembly template or document XML can be configured as follows:

```xml
<?xml version="1.0" encoding="utf-8" ?>
<xs:schema targetNamespace="http://tempuri.org/XMLSchema.xsd"
    elementFormDefault="qualified"
    xmlns="http://tempuri.org/XMLSchema.xsd"
    xmlns:mstns="http://tempuri.org/XMLSchema.xsd"
    xmlns:xs="http://www.w3.org/2001/XMLSchema">
  <xs:element name="Document" >
    <xs:complexType>
      <xs:sequence>
        <xs:element name="Description" type="xs:string"/>
        <xs:element name="Content" type="xs:string" />
        <xs:element name="Sections">
          <xs:complexType>
            <xs:sequence>
              <xs:element name="Section" minOccurs="0" maxOccurs="unbounded">
                <xs:complexType>
                  <xs:sequence>
                    <xs:element name="Description" type="xs:string"/>
                    <xs:element name="Instructions" type="xs:string" />
                    <xs:element name="Start" type="xs:date" />
                    <xs:element name="Due" type="xs:date" />
                    <xs:element name="Status" type="xs:string" />
                    <xs:element name="Content" type="xs:string" />
                    <xs:element ref="Sections" minOccurs="0" />
                  </xs:sequence>
                  <xs:attribute name="Id" type="xs:string" />
                  <xs:attribute name="Name" type="xs:string" />
                  <xs:attribute name="ReassignAllowed" type="xs:boolean" />
                  <xs:attribute name="SubsectionsAllowed" type="xs:boolean"/>
                  <xs:attribute name="Private" type="xs:boolean" />
                  <xs:attribute name="Restricted" type="xs:boolean" />
                </xs:complexType>
```

```
        </xs:element>
      </xs:sequence>
    </xs:complexType>
    </xs:element>
  </xs:sequence>
  <xs:attribute name="Name" type="xs:string" />
  </xs:complexType>
</xs:element>
</xs:schema>
```

In an embodiment, a schema can be used to define an assembly document. The schema can also be used to identify an assembly workspace associated with the assembly document. A document assembler 118 (e.g., API) can be used to perform a number of operations associated with the assembly document and/or assembly workspace. The document assembler 118 can be used to load and save other metadata from and to the assembly workspace 103. In one embodiment, the schema defining an assembly document can be configured as follows:

```
<?xml version="1.0" encoding="utf-8" ?>
<xs:schema targetNamespace="http://tempuri.org/XMLSchema.xsd"
        elementFormDefault="qualified"
        xmlns="http://tempuri.org/XMLSchema.xsd"
        xmlns:mstns="http://tempuri.org/XMLSchema.xsd"
        xmlns:xs="http://www.w3.org/2001/XMLSchema">
  <xs:element name="Workspace">
    <xs:complexType>
      <xs:sequence>
        <xs:element name="WorkspaceUri" type="xs:string" />
        <xs:element name="ToolUri" type="xs:string" />
      </xs:sequence>
    </xs:complexType>
  </xs:element>
</xs:schema>
```

In one embodiment, components of the system 100 can be implemented as part of a peer-to-peer computing environment, including a peer-to-peer synchronization service (e.g., GROOVE). Each peer can include a collaboration application or client that can be used to collaborate with other authors when collaborating on a document, including producing and consuming information. For example, each peer client can receive updates to the document as other authors make changes.

In another embodiment, components of the system 100 can be implemented as part of a client/server computing environment, wherein each client includes a collaboration application that can be used to interact with a server. The server can be configured to host a master assembly document in a library and the sections as a list. The master assembly document can be updated or otherwise modified when a user makes a change to a document. Thereafter, changes, updates, and other modifications can be communicated to respective clients using private copies of the master assembly document. Correspondingly, the master assembly document can be used to track and maintain user changes. For example, each client of the computing environment can use a private copy of the master assembly document to display the content(s) of the master assembly document, including recent changes and modifications thereto when connected to the server.

A computing environment can be described as a network or collection of components wherein the associated components are communicatively coupled in such a manner to provide an operational functionality. Each computing device of a computing environment can include networking and security components configured to provide communication functionality to and from respective components of the associated computing environment. For example, a computing environment can include wireless local area networks (WLANs), local area networks (LANs), wide-area network (WANs), combinations thereof, and/or other types of computing and/or communication networks. In one embodiment, a computing environment can be configured as is a distributed computer network that allows one or more computing devices, communication devices, etc., to communicate when collaborating to create or modify a document according to a desired implementation.

Exemplary computing devices can include desktop computers, laptop computers, tablet computers, handheld devices, and other communication devices. Components of a computing environment can be communicatively coupled using wired, wireless, combinations of wired and wireless, and other communication techniques. A collaboration effort can also include combinations of various communication methods.

Correspondingly, users of the system 100 can receive updates and notifications associated with a collaborative document based in part on the type of computing environment and connectivity. Thus, the system 100 can be used to ensure that collaborating authors are using the same information, up-to-date with modifications to the collaborative document. For example, the communication of modifications can be provided to a collaborating author when the author has network connectivity and has provided proper access credentials (e.g., domain authorization, WINDOWS account, etc.) to access the collaborative document.

According to an embodiment, a collaboration application can be configured to support a process of assembling an assembly document. A number of phases can be included as part of the process, wherein the phases include, but are not limited to:

1) Assembly Template Development Phase—This optional phase involves creating a template from which users create instances of a certain document type. A professional services organization, for example, may create a template for a "statement of work", which could be completed by engagement teams on a per engagement basis. Once ready for use, assembly templates go through a formal publishing process.

2) Assembly Document Creation—In this phase, a user creates a collaborative document or assembly document based on a template, such as an assembly template for example. In one embodiment, an assembly template includes document XML, content controls, and custom XML parts. Some document assembly-specific properties can be set at this phase. This phase ends when the user associates the assembly document with a document assembly workspace, thereby associating the assembly document to the assembly workspace. In an embodiment, an assembly workspace can be created with a uniform resource identifier (URI) that can be stored in the document XML. The document assembly component can use the URI to locate an associated assembly workspace and thereby access its APIs. In one embodiment, an assembly document includes document XML, content controls, custom XML parts, and a number of workspace form records.

3) Collaboration Setup Phase—In the setup phase, a user, such as an editor for example, can select an assembly template and/or specify the structure of the document to be assembled by creating sections in an assembly document. The user can also define the users or participants who can interact with each section of the assembly document.

4) Authoring Phase—In the authoring phase, individual authors can add content to sections assigned to each author. These sections can be subject to approval or review workflows.

5) Publishing Phase—In the publishing phase, the final assembly document may be transformed to a different format, stored in a document management repository, etc. The output of the publishing phase is a published assembly document.

Table 2 below lists a number of roles or properties that can be used in the assembly process, under an embodiment.

TABLE 2

| Role | Description |
|---|---|
| Editor | A user that is responsible for the document assembly process. Each assembly document has one editor. The Editor assigns sections to Authors. The assembly document can be described as a temporary document dynamically created for each participant when they open the original assembly document created by the editor. This role can be reassigned. The Editor property can be populated automatically with the workspace account name of the user that opens the assembly document when it is associated with a workspace. |
| Author | An Author is a user responsible for contributing content to one or more sections of a document to be assembled. |
| Observer | The Observer role allows defined users to be made aware of progress relative to the document assembly process, even though they may not be directly participating in the collaboration. |

A single user may fulfill multiple roles in a given document assembly. For example, an Editor may also be an Author.

In an embodiment, a number of permissions can be associated with an assembly document. A read permission allows a user to view all document and section properties, non-restricted sections content, and all interstitial content. An edit section content permission allows a user to modify content of an assigned section. An update metadata for all root sections permission allows a user to update the author, due date, and restricted properties. The update metadata for all sub-sections permission allows a user to update the author, due date, and the restricted properties for all sub-sections if the user is the parent section's author. The insert root section property allows a user to insert a section in the main document (e.g., the interstitial content); this permission coincides with the permission to edit interstitial content.

The insert sub-section property allows a user to insert section within an existing section if: 1) the user is the parent section's author; and, 2) the parent section's "allow sub-section" property is set to true. The delete root section property allows a user to delete a section from the main document (i.e. the interstitial content). This coincides with the permission to edit interstitial content. The delete sub-section property allows a user to delete a section within an existing section if the user is the parent section's author. The edit interstitial content permission allows a user to edit a document's content that is not stored in any sections. The change editor permission allows an editor to assign a new editor for an assembly document.

As described above, assembly sections can be rendered using a number of content controls. In one embodiment, a section name corresponds with a title of the content control. Placeholder text corresponds to the section description. All sections are not editable by default, but the property can be changed to unlocked if the user is the section's author. Each section that is not nested in another section is termed a root section. An editor has primary control over root section, wherein the editor role can be used to create root sections and can continue to edit certain properties even after the properties are assigned to other workspace participants. Each root section can be assigned an integer to indicate the sequential position in the assembly document. Each section that is nested in another section is termed a sub-section. The section which includes a sub-section is termed a parent section. In one embodiment, a parent section can have no more than 5 levels in a section nesting hierarchy and/or may contain no more than 20 sub-sections at the same level. If any of these limits are reached, the "Insert" button in the section ribbon group can be disabled.

Figure 2A:
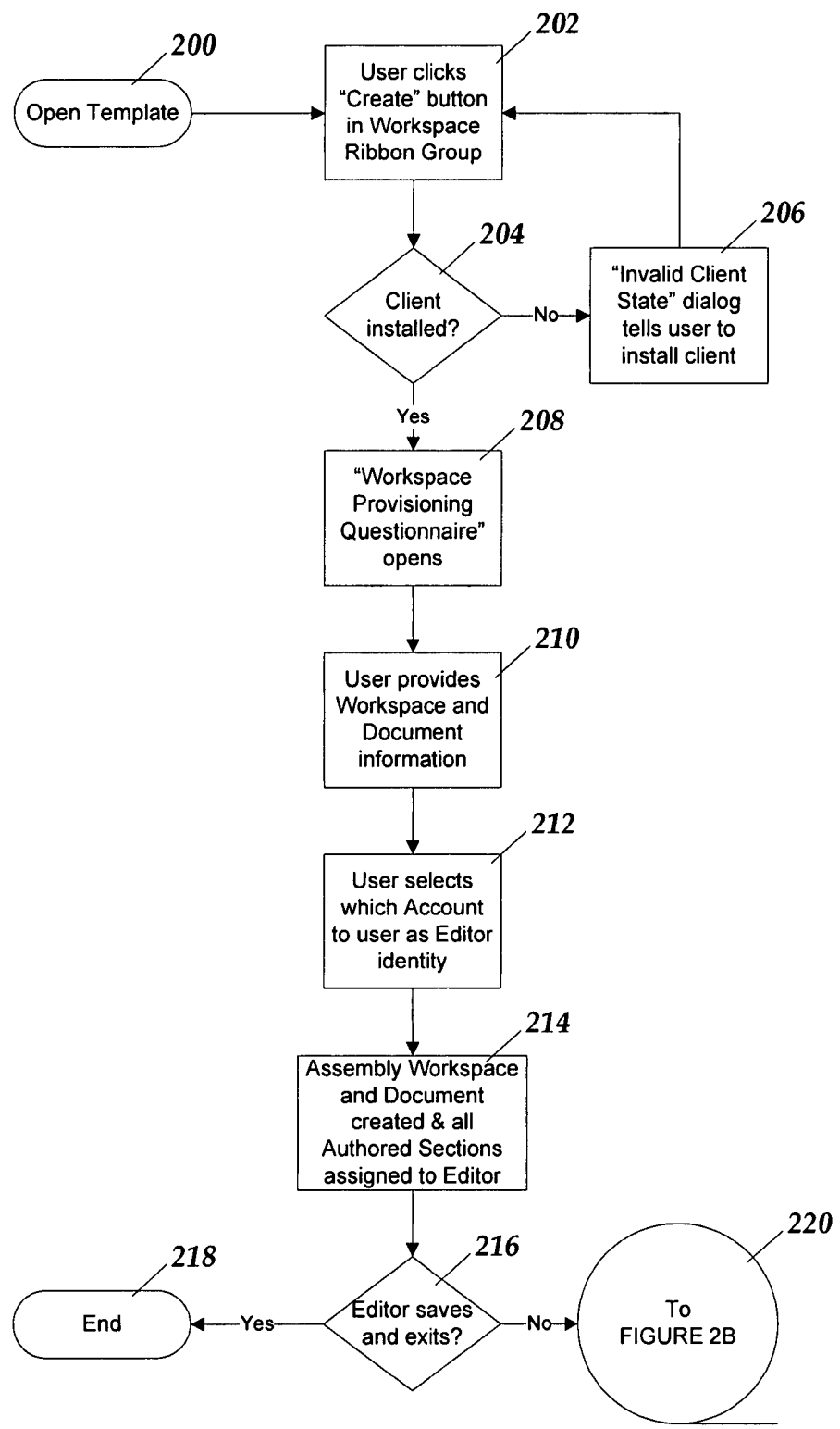
FIGS. 2A-2C depict flow diagrams illustrating a collaborative process.
Figure 2B:
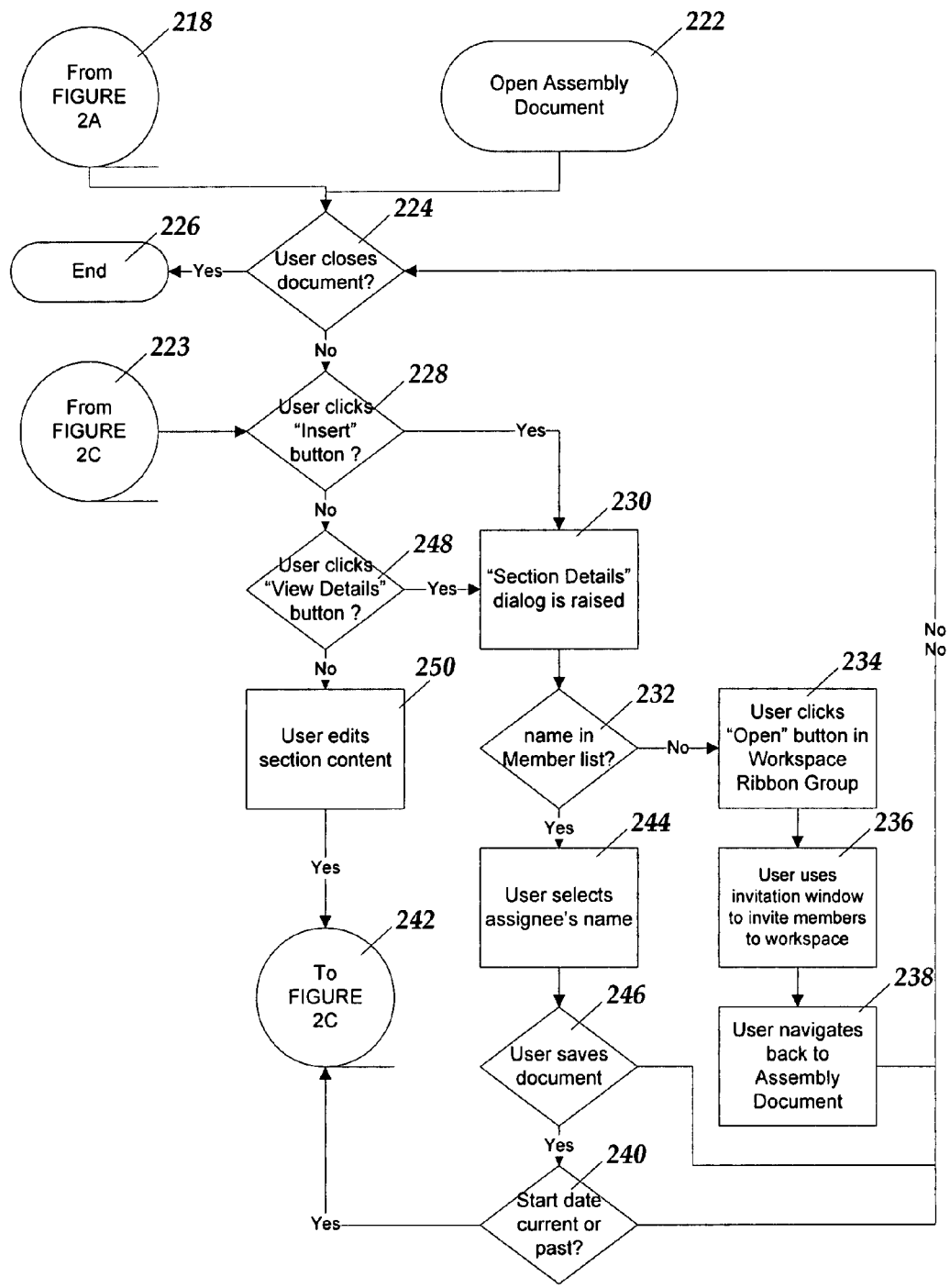
Figure 2C:
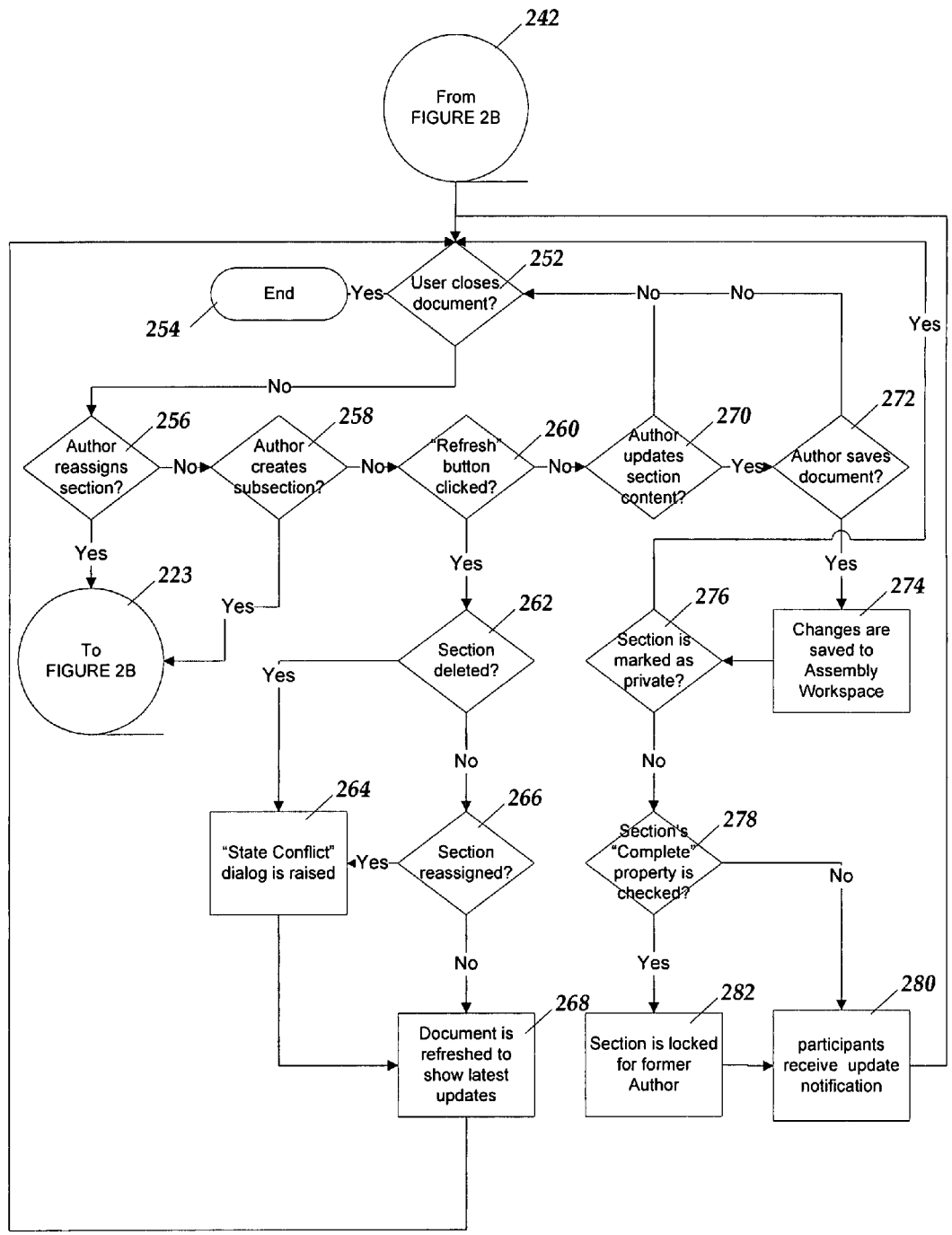

FIGS. 2A-2C depict a flow diagram which illustrates a collaborative process, under an embodiment. Components of FIG. 1 are used in the description of FIGS. 2A-2C, but the embodiment is not so limited. FIG. 2A depicts a process of creating a collaborative document, also referred to as an assembly document. At 200, a user can use a word processing application to open a template. At 202, the user can click a "create" button of a workspace ribbon group to create a new assembly document based in part on parameters associated with the particular template.

At 204, the document assembly component 122 can use an API to determine if a client 101 is installed on the user's computing device. If a client 101 is not installed on the user's computing device, the flow proceeds to 206 and a message is presented to the user (e.g., invalid client state) and the user is asked to install a client 101, and the flow returns to 202. If a client 101 is installed, the flow proceeds to 208, and a workspace provisioning questionnaire opens in the client 101. If the user has only one identity, it is used for the collaboration process. However, if the user has multiple identities, all of the identities are displayed and the user is asked which one they will be using in the new assembly workspace. If the user has no identities, they will be asked to create a new account.

In one embodiment, the workspace provisioning questionnaire can be configured as a custom form including the following fields as shown in Table 3 below.

TABLE 3

| Property | Type | Required | Details |
|---|---|---|---|
| Workspace Name | TextBox | Y | The name of a new assembly workspace |
| Workspace Description | TextBox | N | |
| Document Name | TextBox | Y | The friendly name of a new assembly document |
| Document File Name | TextBox | Y | The name of the assembly document attachment file |
| Document Abstract | TextBox | N | |
| Editor Identity | ListBox | Y | Displays all of the user's identities from |

TABLE 3-continued

| Property | Type | Required | Details |
|---|---|---|---|
| | | | which they must select one to be the identity they use as Editor in the new assembly workspace |
| Open Assembly Document from Workspace | Checkbox | Y | Indicates whether the new assembly document will be opened automatically after the new workspace has been created |

At 210, the user can provide workspace and document information associated with a collaboration effort. For example, the user can define participants, roles, participant sections, etc. At 212, the assembly component 122 operates to create an assembly workspace 103 and an associated assembly document 114. At this point, all authored sections are assigned to the editor role. At 216, the editor can save the work to this point and the flow proceeds to 218 of FIG. 2B. Otherwise, the flow ends at 220.

At 218, the user, as the editor, can begin the process of assigning one or more authored sections. Also, at 222, a user can use the client 101 to open an existing assembly document. In addition, the flow can proceed from 223 of FIG. 2C. From 218 or 222, the flow proceeds to 224 and the document assembly component 122 determines if the user has closed the assembly document 114. The flow ends at 226 if the user has closed the assembly document 114. Otherwise, the flow proceeds to 228 and the document assembly component 122 determines if the user has clicked the "insert" button in the section ribbon group. If the user has clicked the insert button, the flow proceeds to 230, and the document assembly component 122 provides a "section details" dialog.

In one embodiment, the section details dialog can be presented as a form for creating and editing section metadata and includes a number of the following identifiers as shown in Table 4 below.

TABLE 4

| Property | Editable | Editable by | Description |
|---|---|---|---|
| Name | Y | Editor (anytime) | Name of section |
| Description | Y | Editor (anytime) | Brief description of section |
| Date Created | N | | The date/time the section was inserted into the document. |
| Date Created | N | | The date/time the section was last modified. |
| Content | Y | | The section's content. |
| Author | Y | Editor (anytime), Author (when "Allow to Reassign" property is selected) | User responsible for adding content to a section. If there is a conflict the Editor's change is used. |
| Start Date | Y | Editor Author | Date indicating when the Author may begin editing the section |
| Due Date | Y | Editor Author | A date indicating when the section should be completed by the Author. |
| Status | Y | Author | Displays the status of the section. |
| Instruction | Y | Editor Author | Read-only instructions |
| Allow to Reassign | Y | Editor Author | Set by Editor to determine if assigned author can reassign a section to other authors. Note, an author should always be able to re-assign the section back to Editor |
| Allow to Insert Sections | Y | Editor Author | Determines if Authors can insert new sections within their section. |
| Private | Y | Author | Default is unchecked. If checked, the section is not committed to the workspace. |
| Complete | Y | Author | Indicates section completed. |

In one embodiment, clicking the insert button operates to create a new content control, including adding a new authored section to the assembly document proxy 124. As part of the insert operation, a content control ID is associated with the new authored section as its unique identifier and a new ordinal value indicating its position relative to other authored sections. The ordinal value of all authored sections further down the assembly document are updated to display their new relative positions (e.g., A new section added between Section 2.0, Section 3.0 would lead to the following state: Section 2.0, Section 3.0 (new section), Section 4.0 (formerly 3.0). A subsection added to 3.0 would be numbered 3.1.0, and a subsection added to 3.1.0 would be 3.1.1.0, etc.).

At 232, the document assembly component 122 can use a number of APIs to determine if the section assignee's name is included in a member list associated with the assembly document 114. If the section assignee's name is not included in the member list, the flow proceeds to 234, and the user can click the "open" button in the workspace ribbon group. At 236, the user can use an invitation window of the client 101 to invite members to the workspace associated with the assembly document 114.

At 238, the user can navigate back to the assembly document 114 and the flow proceeds to 240, wherein the document assembly component 122 determines if the start date is current or past. If the start date is not current or past, the flow returns to 224. If the start date is current or past, the flow proceeds to 242 of FIG. 2C. If the section assignee's name is included in the member list associated with the assembly document at 232, the flow proceeds to 244 and the user can select the assignee's name. If the user chooses to save the assembly document 114 at 246, the flow again proceeds to 240. Otherwise, the flow returns to 224.

If the user has not clicked the insert button at 228, the flow proceeds to 248 and the user can click a "view details" button in the section group. If the user has not clicked the "view details" button at 248, the flow proceeds to 250, where the user, if assigned as an author to the section, can edit section content. If the user does edit section content, the flow proceeds to 242 of FIG. 2C. As shown in FIG. 2C, at 252 the user can close the assembly document 114. If the user closes the assembly document 114 at 252, the flow ends at 254.

Otherwise, the flow proceeds to 256 and the user, as a permitted author, can reassign a section. If the author decides to reassign a section, the flow returns to 223 of FIG. 2B. Otherwise, the flow proceeds to 258 and the author can create a subsection of an existing section. If the author decides to create a subsection at 258, the flow again returns to 223 of FIG. 2B. If the author does not want to create a subsection at 258, the flow proceeds to 260 and the user can click a refresh button in the ribbon group which operates to update the assembly document 114. The refresh operation operates to update the assembly document properties, interstitial content, and/or all of the sections with the associated metadata and content.

If the user wants to refresh at 260, the flow proceeds to 262, wherein the document assembly component 122 can use a number of APIs to determine if a section has been deleted. If a section has been deleted, the flow proceeds to 264 and the document assembly component 122 raises the "State Conflict" dialog. If a section has not been deleted at 262, the document assembly component 122 can use a number of APIs to determine if a section has been reassigned at 266. If a section has been reassigned at 266, the flow returns to 264. Otherwise, the flow proceeds to 268 and the assembly document 114 is refreshed to show the latest updates from the editor and authors. Thereafter, the flow returns to 252.

If the user does not want to refresh at 260, the flow proceeds to 270 and the author can update section content. If the author does not update section content at 270, the flow returns to 252. If the author does update section content at 270, the flow proceeds to 272 and the author can save the assembly document 114. If the author saves the assembly document 114 at 272, the flow proceeds to 274 and changes are saved to the assembly workspace 103. The flow proceeds to 276, and the document assembly component 122 determines if the section is marked as private. If the section is marked as private, the flow returns to 252.

If the section is not marked private, the flow proceeds to 278 and the document assembly component 122 determines if the section's "Complete" property is checked. If the "Complete" property is not checked, the flow proceeds to 280 and an update (e.g., "Section Update") notification can be issued to the participants and the flow returns to 252. In one embodiment, the document assembly component 122 can be configured to display an update notification to an associated participant by assessing changes associated with the data store 102. In another embodiment, an e-mail or instant messenger notification can be sent to the participants to indicate a change when a section is updated as completed. If the "Complete" property is checked, the flow proceeds to 282 and the section is locked for the former author. The flow then returns again to 252.

Figure 3:
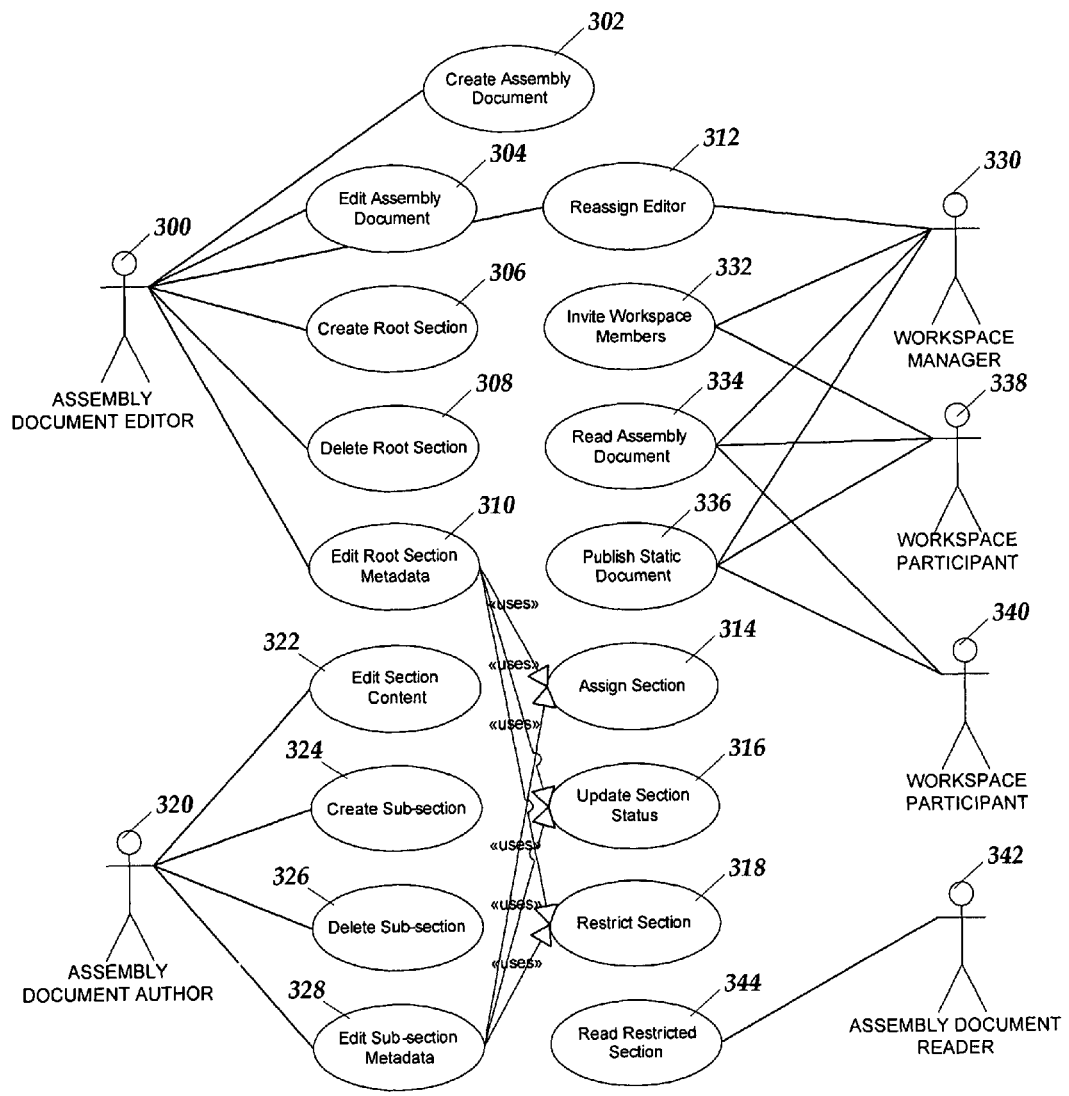
FIG. 3 is a diagram depicting use case scenarios associated with a collaborative process.

FIG. 3 is a diagram depicting use case scenarios associated with a collaborative process, according to an embodiment. As shown in FIG. 3, a number of users having varying roles can be associated with a collaborative process. An assembly document editor 300 has a number of associated privileges, including, but not limited to: creating an assembly document 302; editing an assembly document 304; creating a root section 306; deleting a root section 308; and, editing root section metadata 310. The assembly document editor 300 can also reassign an editor 312 identity, including the associated editor privileges, to another user. Editing root section metadata 310 can be used to assign a section 314, update section status 316, and restrict a section 318.

An assembly document author 320 has a number of associated privileges, including, but not limited to: editing section content 322; creating sub-sections 324; deleting sub-sections 326; and, editing sub-section metadata 328. Editing sub-section metadata 328 can also be used to assign a section 314, update section status 316, and restrict a section 318.

An assembly workspace manager 330 has a number of associated privileges, including, but not limited to: reassigning an editor 312; inviting assembly workspace members 332; reading an assembly document 334; and, publishing a static assembly document 336.

An assembly workspace participant 338 has a number of associated privileges, including, but not limited to: inviting assembly workspace members 332; reading an assembly document 334; and, publishing a static assembly document 336.

An assembly workspace guest 340 has a number of associated privileges, including, but not limited to: reading an assembly document 334 and publishing a static assembly document 336.

An assembly document reader 342 has the privilege to read a restricted section 344. While a number of roles and associated privileges are described above, other embodiments are available.

An example scenario illustrates use of the system 100 described above. David is preparing a sales proposal for a key client. David is designated as the document editor and opens a sales proposal template using a word processing application (e.g., WORD). David then adds content to some of the template sections. David also creates and assigns a number of new template sections. For example, David can add characteristics to each new template section, such as a section name, an authorized author, responsible users, etc.

Thereafter, David provisions an assembly workspace so that other members of the sales team can provide content to assigned sections. In an embodiment, provisioning refers to the creation of an assembly workspace and the setup required for users to begin participating in a document assembly process. In one embodiment, the provisioning of an assembly workspace includes the following steps, but is not so limited:

1) A user uses a UI (e.g., Ribbon, etc.) to invoke a create assembly workspace action 2) The user completes a provisioning questionnaire, providing required and other collaboration parameters.

3) An assembly workspace can be created based on a template (existing or created) and opens on the user's computing device. The assembly workspace can include an associated assembly document.

In one embodiment, a number of provisioning parameters can be associated with the assembly workspace as shown in Table 5 below.

TABLE 5

| Parameter | Description | Comments |
| --- | --- | --- |
| Document name | A name for the document stored as metadata and used in notifications, etc. | |
| Workspace name | The name of the Workspace | Valid workspace name |
| Description | A brief description of the workspace | Valid description |
| Editor identity | The identity of the editor | |
| Abstract | Brief description of the document | Free-form text. |
| Document file name | See File Name Parameter section below. | The file name parameter can include the current file name as a default value if the assembly document has been saved. Users can change this value. If the assembly document has not been saved, this parameter is blank. If no file name is provided by the user, a name can be automatically generated. |

Each member then has a complete copy of the collaborative document on their client. David assigns specific sections of the document to individual contributors specifying certain expectations. The assigned sections are then locked so only the assigned contributor can make changes thereto. David limits visibility of highly sensitive sections to only a limited number of contributors. The team collaborates on the sales proposal, wherein individual contributors work in parallel on sections assigned to them. All changes made by each contributor automatically appear in each member's copy. When David sees collaboration is complete, he delivers the complete compound document to the key client.

As another example, assume that a participant receives an invitation to collaborate on a document. After accepting the invitation, the participant sees the document in an assembly workspace. The participant can click on the document in the assembly workspace which operates to invoke an assembly component whose components operate to build the document which is tailored to the participant based on a role and one or more privileges. The participant can edit one or more sections, if the participant has access to one or more sections. For example, the participant can make certain requested changes to sections of the collaborative document, and can thereafter save those changes.

The changes are then communicated to a data store, wherein the associated records can be updated with the saved changes. Thereafter, the saved changes can be disseminated to other users associated with the collaborative document and presented in an associated assembly workspace. For example, notifications can be communicated to other users informing them of the changes to the collaborative document or asking them to review and/or further modify the collaborative document. In one embodiment, changes associated with a collaborative document can be propagated outside of the control or awareness of a word processing application.

In an embodiment, an OpenXML file format can be used to create composite documents composed of meaningful entities. Entities can include, but are not limited to: workspace, document, section, editor, author, and observer. Entities can be defined using custom schemas that detail content, state, relationship with other entities, version, locking behavior, and/or project status. When users wish to begin collaboration, a number of entities can be stored in a data store in order to:

1) generate complete copies of a document for each participant, thereby avoiding the pitfalls of splintered copies and version conflicts;

2) enable asynchronous and/or synchronous collaboration via various networking and communication environments;

3) facilitate communication using various communication abilities (e.g., instant messengers (IMs), e-mail, etc.);

4) monitor changes and project progress using custom views; and, 5) create participant awareness using membership status tracking.

In various embodiments, groups, teams, etc. can simultaneously interact with a collaborative document, including progress tracking, assigning responsibility, preventing unintentional overwrites, and/or sub-document locking based in part on a user's role. A collaborative document can be stored and maintained using a web service, server, on a peer machine, and/or on the user's computing device. The collaborative document can then be communicated to defined participants when they have connectivity. Depending on the communication architecture, synchronization of the collaborative document operates to aggregate changes made by each participant so that each participant obtains other user modifications. In alternative embodiments, the functionality and operation of the various components can be combined to provide fewer components and/or a desired implementation.

Other embodiments and collaborative functionality are available.

Exemplary Operating Environment

Figure 4:
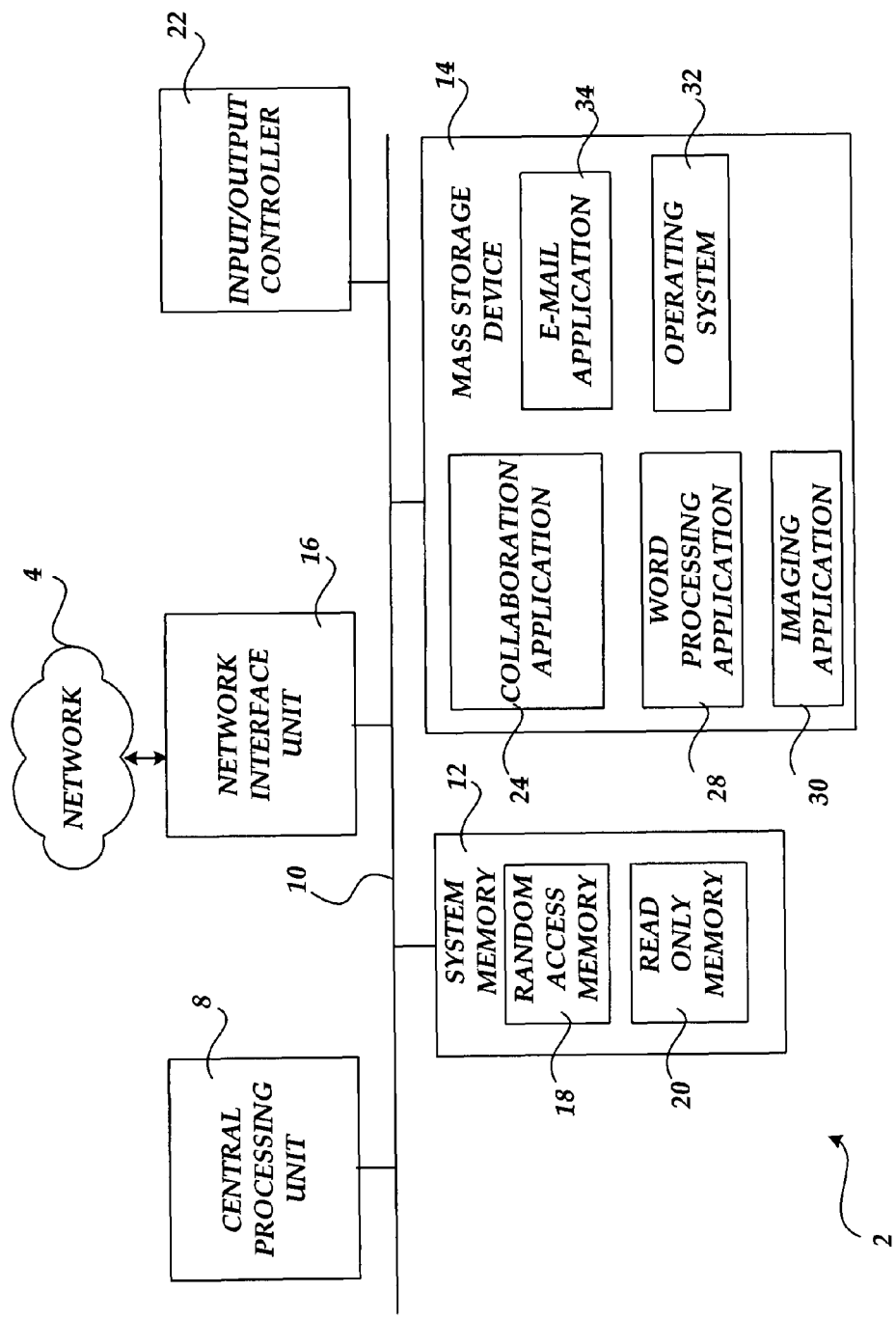
FIG. 4 is a block diagram illustrating a computing environment for implementation of various embodiments described herein.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, finger, and/or other means. Similarly, an input/output controller 22 may provide output to a display, a printer, or other type of output device. Additionally, a touch screen can server as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a collaboration application 24, word processing application 28, an imaging application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A non-transitory computer-readable medium including executable instructions which, when executed, collaborate information by:

using a computer-implemented client to define an assembly workspace including associating one or more users as one or more participants of the assembly workspace, wherein the client is configured to interact with other clients as part of a collaborative authoring effort;

associating an assembly document, including using a master assembly document to track and maintain user changes, with the assembly workspace including providing an in-memory manifestation of a state of the assembly document that includes data, metadata, content, and actions, and using an assembly document proxy to build the assembly document using stored information and an assembly document object to create a number of sections and a number of authored section content controls based in part on one or more of a first property associated with a begin editing operation, a second property associated with a completed section operation, a third property associated with a section status, a fourth property associated with an allow to reassign operation, and a fifth property associated with an allow to insert sections operation;

applying a number of constraints to the assembly document, wherein the number of constraints determines which of the one or more participants is permitted to interact with the number of sections of the assembly document, the number of constraints defined in part by an editor role, an author role, and an observer role, wherein the editor role can be used to assign sections to authors including enabling an assigned author to reassign a section to other authors responsible for contributing content to one or more of the number of sections of the assembly document including editing root section metadata as part of assigning sections, updating section status, and restricting sections; and, generating a complete copy of the assembly document for each participant as part of a document assembly process using the assembly workspace and the assembly document proxy.

2. The non-transitory computer-readable medium of claim 1, wherein the instructions, when executed, collaborate information by using an open XML standard as part of the collaborative authoring effort that includes generating the complete copy of the assembly document for each participant as part of the document assembly process using the assembly workspace including aggregating changes made by each participant and using the observer role to allow defined users to be made aware of progress relative to the document assembly process.

3. The non-transitory computer-readable medium of claim 1, wherein the instructions, when executed, collaborate information by storing the assembly document in a data store associated with the client, wherein the assembly document is stored as a collection of constituent parts, updating the master assembly document when a user makes a change to the assembly document, and communicating changes to respective clients using private copies of the master assembly document.

4. The non-transitory computer-readable medium of claim 1, wherein the instructions, when executed, collaborate information by launching a word processing application when a user selects the assembly document, wherein one or more of the number of constraints are applied based in part on an identity of the user.

5. The non-transitory computer-readable medium of claim 1, wherein the instructions, when executed, collaborate information by notifying each participant of a modification to the assembly document when an associated client is in communication with a computing network.

6. The non-transitory computer-readable medium of claim 5, wherein the instructions, when executed, collaborate information by updating the assembly document with the modification after notifying a participant of the modification.

7. The non-transitory computer-readable medium of claim 1, wherein the instructions, when executed, collaborate information by notifying a participant of a modification to the assembly document when an associated client is in communication with a peer-to-peer computing network.

8. The non-transitory computer-readable medium of claim 1, wherein the instructions, when executed, collaborate information by notifying a participant of a modification to the assembly document when an associated client is in communication with a client and server-based computing network.

9. The non-transitory computer-readable medium of claim 1, wherein the instructions, when executed, collaborate information by presenting the assembly document to a participant based on a workspace identity, workspace role, or an assembly document role, and using a read permission to allow viewing of all document and section properties, non-restricted sections content, and all interstitial content, an edit section content permission to allow modification of content of an assigned section, an update metadata for all root sections permission to allow updates to author, due date, and restricted properties, an update metadata for all sub-sections permission to allow a parent section user to update the author, the due date, and the restricted properties for all sub-sections, and an insert root section property to allow insertion of interstitial content in a main document associated with the assembly document.

10. The non-transitory computer-readable medium of claim 1, wherein the instructions, when executed, collaborate information by using the metadata to define the number of constraints to determine which of the one or more participants is permitted to interact with one or more of the number of sections of the assembly document, wherein the number of authored section content controls can define when an author may begin editing a corresponding section, when the corresponding section should be completed, a section status of the corresponding section, an allow to reassign operation for the corresponding section, an allow to insert sections operation for the corresponding section, and a complete indication for the corresponding section.

11. The non-transitory computer-readable medium of claim 1, wherein the instructions, when executed, collaborate information by building the assembly document using information associated with a data store and the assembly document object to create the number of authored section content controls and other document parameters; and inserting a new content control including adding a new authored section to the assembly document proxy and associating a new ordinal value indicating a position of the new authored section relative to other authored sections as part of the document assembly process.

12. The non-transitory computer-readable medium of claim 1, wherein the instructions, when executed, collaborate information by using a schema to identify the assembly workspace associated with the assembly document.

13. The non-transitory computer-readable medium of claim 1, wherein the instructions, when executed, collaborate information by assigning one or more of the number of sections to one or more authors associated with the assembly document.

14. A computer system configured to provide for the collaboration of information comprising:

a computer-implemented client associated with each user of the system, the client comprising:
an assembly workspace including a sections component and an assembly document representation; and,
a data store including memory to store information of a number of participants associated with an assembly document, wherein the information is associated with content, state, relationship with other entities, version, locking behavior, and status; and, a computer-implemented assembly component to:
assemble the assembly document, including using a master assembly document to track and maintain user changes, after interacting with the assembly document representation;
provide an in-memory manifestation of a state of the assembly document that includes data, metadata, content, and actions;
apply a number of constraints to the assembly document, wherein the number of constraints determine users permitted to interact with a number of sections of the assembly document, the number of constraints defined in part by an editor role, an author role, and an observer role, wherein the editor role can be used to assign sections to authors including enabling an assigned author to reassign a section to other authors responsible for contributing content to one or more of the number of sections of the assembly document including editing root section metadata as part of assigning sections, updating section status, and restricting sections;
use an assembly document proxy to build the assembly document based in part on the information and an assembly document object to create a number of authored section content controls based in part on one or more of a first property associated with a begin editing operation, a second property associated with a completed section operation, a third property associated with a section status, a fourth property associated with an allow to reassign operation, and a fifth property associated with an allow to insert sections operation customized for an end-user user based in part on the information stored in the data store including an associated role and other permission parameters associated with the end-user; and, generate a complete copy of the assembly document for each participant as part of a document assembly process using the assembly workspace and the assembly document proxy.

15. The system of claim 14, the assembly document proxy further to provide the manifestation of the assembly document, wherein the assembly document proxy includes the data, metadata, and content to be used to persist the assembly document on the client.

16. The system of claim 14, further comprising a number of custom XML parts to uniquely associate the assembly document with the assembly workspace.

17. A method of contributing to a collaborative effort comprising:

using a computer system as part of creating a collaborative document based in part on a template including using a master document to track and maintain user changes, wherein the template includes document XML, one or more authored section content controls, and custom XML parts, and can be used to define a number of participants that can interact with the collaborative document;

specifying a number of sections associated with the collaborative document, wherein an author selected from the number of participants can be associated with one or more of the number of sections;

associating the collaborative document with a workspace for interacting with the collaborative document including providing an in-memory manifestation of a state of the collaborative document that includes data, metadata, content, and actions;

assembling the collaborative document using an assembly document proxy to build the collaborative document using stored information and an assembly document object to create the number of sections and one or more authored section content controls based in part on one or more of a first property associated with a begin editing operation, a second property associated with a completed section operation, a third property associated with a section status, a fourth property associated with an allow to reassign operation, and a fifth property associated with an allow to insert sections operation for the collaborative document;

using the workspace to add content to one or more of the number of sections of the collaborative document;

applying a number of constraints to the collaborative document, wherein the number of constraints determine users permitted to interact with the number of sections of the collaborative document, the number of constraints defined in part by an editor role, an author role, and an observer role, wherein the editor role can be used to assign sections to authors including enabling an assigned author to reassign a section to other authors responsible for contributing content to one or more of the number of sections of the collaborative document including editing root section metadata as part of assigning sections, updating section status, and restricting sections;

notifying one or more of the number of participants of a change to the collaborative document; and, generating a complete copy of the collaborative document for each participant as part of an assembly process using the workspace and the assembly document proxy.

18. The method of claim 17, further comprising associating a number of permissions to aspects of the collaborative document and associated workspace.

19. The method of claim 17, further comprising communicating the collaborative document using a peer-to-peer communication network.

20. The method of claim 17, further comprising communicating the collaborative document as part of a client and server-based communication network.

* * * * *